United States Patent [19]

Watkins et al.

[11] 3,952,526
[45] Apr. 27, 1976

[54] FLEXIBLE SUPPORTIVE JOINT FOR SUB-SEA RISER FLOTATION MEANS

[75] Inventors: Bruce J. Watkins, Rancho Palos Verdes; Albert M. Regan, Huntington Beach; William P. Slota, Northridge, all of Calif.

[73] Assignee: Regan Offshore International, Inc., Torrance, Calif.

[22] Filed: Feb. 3, 1975

[21] Appl. No.: 546,710

[52] U.S. Cl. .................................. 61/46; 166/.5; 285/226; 285/231
[51] Int. Cl.² ........................................ E21B 7/12
[58] Field of Search ............... 61/46, 72.3, 72.1, 69; 166/.5, .6; 175/7; 285/231, 226

[56] References Cited
UNITED STATES PATENTS

| 3,189,372 | 6/1965 | Johnson | 175/7 X |
| 3,515,396 | 6/1970 | MacVaugh | 285/231 X |
| 3,692,337 | 9/1972 | Mischel | 285/226 |
| 3,858,401 | 1/1975 | Watkins | 61/46 |

Primary Examiner—Jacob Shapiro

[57] ABSTRACT

A flexible supportive joint is provided between a buoyancy chamber of flotation means and a sub-sea well riser conduit upon which the flotation means is mounted. In a preferred exemplary embodiment, such flexible supportive joint comprises an assembly of coaxial, telescopically oriented pipe sections with a cylindrical elastomeric member bonded therebetween to flexibly join the two sections in load bearing relation, one section being connected to the riser conduit with the other section being connected to the flotation means buoyancy chamber. In a first alternative exemplary embodiment, the flexible supportive joint is provided by a ball and socket-like connection while in a second alternative construction, the flexible supportive joint is provided by a combination of an elastomeric member in load bearing relation with coaxial conduit sections and a ball and socket-like joint between the sections.

23 Claims, 5 Drawing Figures

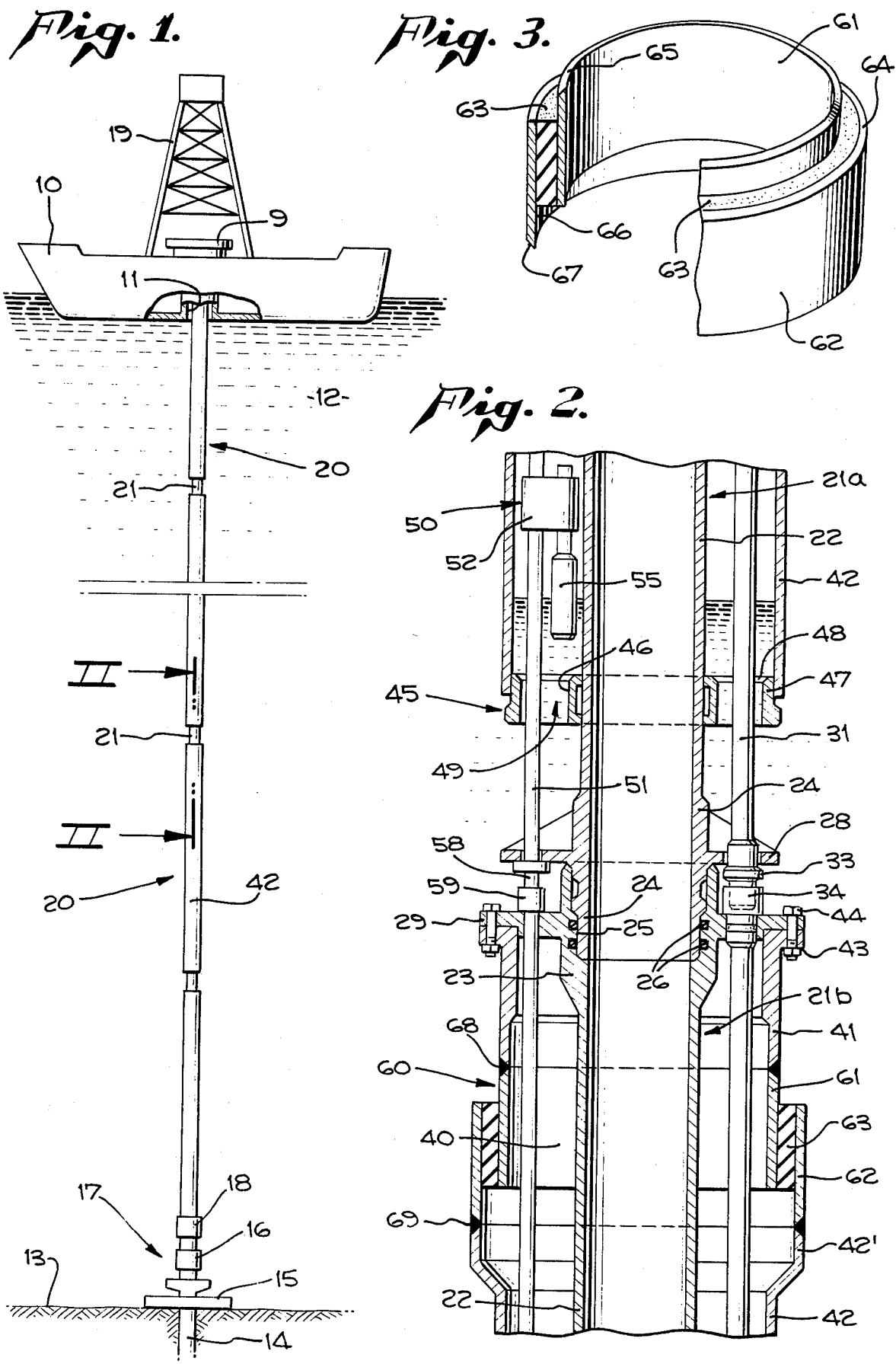

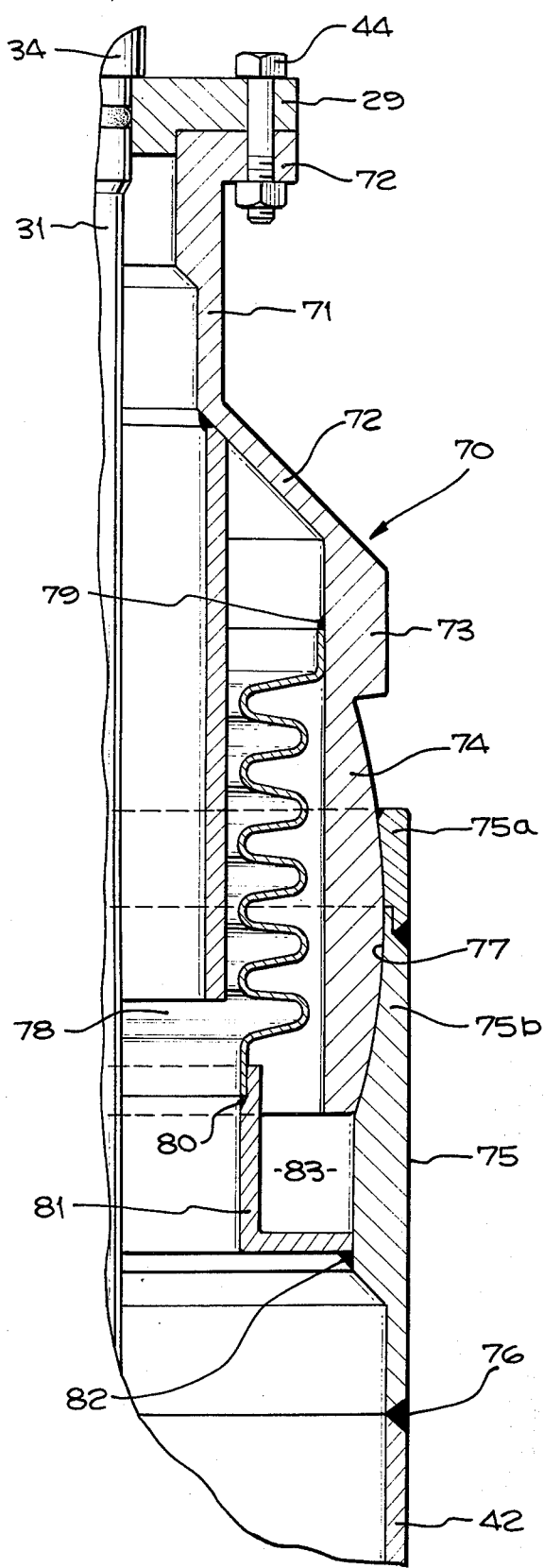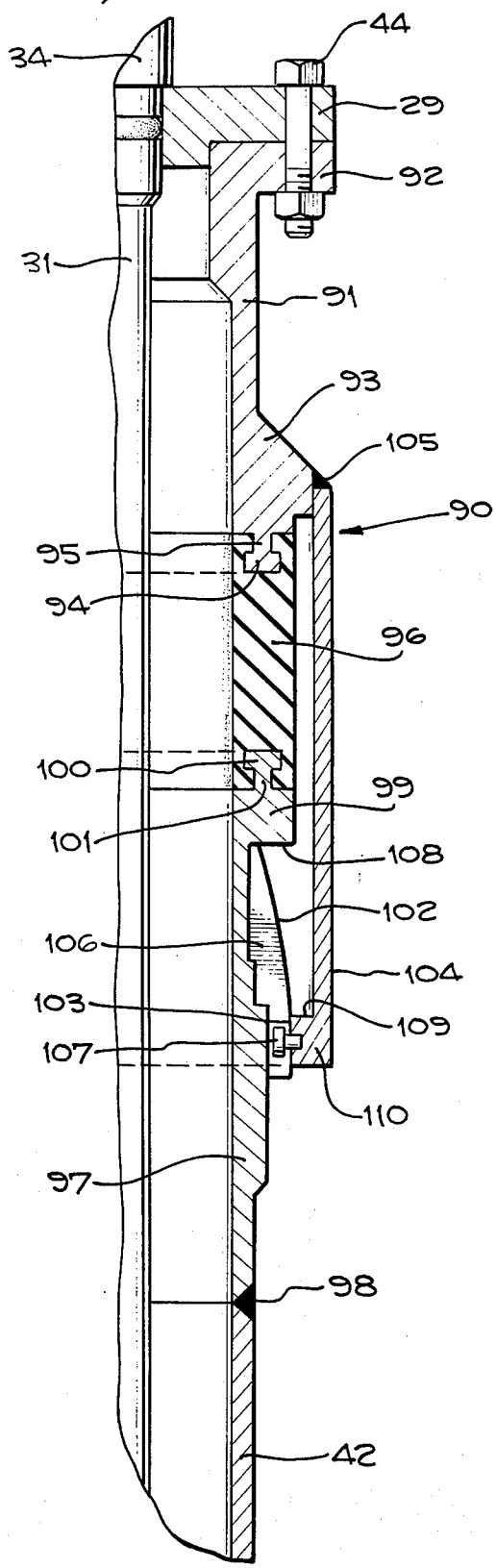

FLEXIBLE SUPPORTIVE JOINT FOR SUB-SEA RISER FLOTATION MEANS

BACKGROUND OF THE INVENTION:

The present invention relates in general to sub-sea oil well equipment and in particular to means for providing a flexible supportive joint between buoyancy chambers of flotation means provided for a sub-sea riser conduit run from a floating vessel to a sub-sea well.

Flotation means for sub-sea well risers have been developed heretofore and in particular as disclosed in prior U.S. Pat. No. 3,858,401. In that patent, a plurality of buoyancy chambers are mounted about a plurality of riser conduits run from a floating vessel to a well. Gas conduits connected each chamber with a source of compressed gas on the floating vessel in order that selectable amounts of buoyancy could be introduced into the riser system. The various advantages of being able to disconnect from the riser conduit, leaving it floating in the sea, and providing support for the long conduits during drilling operations where vessel movement may occur were explained in that patent. Even with the improvement of the flotation means of U.S. Pat. No. 3,858,401, there will still be some bending and/or flexing of the riser conduit due to movement of the vessel on the surface of the sea. It is therefore desirable to provide the flotation means for such sub-sea risers in such a manner as to not reduce the flexibility or bendability of the riser conduit.

It is therefore the primary object of the present invention to disclose and provide an improved manner of mounting flotation means to a sub-sea well riser conduit such that the mounting of the associated buoyancy chambers does not unduly increase stress on the riser, unduly increase its rigidity or unduly limit its flexibility under normal conditions of use as can be expected in deep off-shore sub-sea well drilling operations.

It is a still further object of the present invention to disclose and provide an improvement in flotation means for a sub-sea well riser to provide a flexible supportive joint for use between each buoyancy chamber and each associated riser conduit whereby the chambers may flex relative to the riser conduit and thus not impair its overall flexibility as normally required in deep off-shore drilling operations.

It is a still further object of the present invention to disclose and provide an improvement in flexible supportive joint for buoyancy chambers associated with a riser wherein an elastomeric member may be provided in a supporting relation between the chambers and riser conduits as well as providing for a flexible interconnection.

It is a still further object of the present invention to disclose and provide mechanical flexible joint means suitable for use between flotation means buoyancy chambers and an associated riser conduit section alone and in connection with flexible supportive elastomeric joint members.

These and other objects of the present invention will become more readily apparent to those skilled in the art from a consideration of the detailed description of preferred and alternative exemplary embodiments thereof set forth hereinafter.

BRIEF SUMMARY OF THE INVENTION:

In general, the improvement in means for mounting a flotation means to a sub-sea well riser, according to the present invention, includes the provision of a flexible supportive joint between the flotation means buoyancy chamber and the riser whereby the chamber is supported from and flexible relative to the riser. More specifically, a flexible supportive joint assembly is provided wherein a first conduit section is provided with means for mounting it to the riser, a second conduit section is provided for mounting to the buoyancy chamber. Said first and second conduit sections are oriented relative to one another in concentric, telescopic relationship and a cylindrical elastomeric member is bonded therebetween in a preferred exemplary embodiment whereby the sections are flexibly joined together in supportive relationship to support the buoyancy chambers in a flexible manner relative to the riser conduit. In alternative exemplary embodiments of the present invention, said first and second conduit or connector sections are provided with mating interengaging ball and socket-like portions for supporting the buoyancy chambers flexibly from the riser alone or in combination with an associated joining and relatively supporting elastomeric member. A more complete understanding of the present invention in a flexible supportive joint for mounting buoyancy chambers to a sub-sea well riser will be afforded to those skilled in the art from a consideration of the following detailed description of exemplary embodiments thereof. Reference will be made to the appended sheets of drawings, like numbers referring to like parts throughout, which follows the following brief description of the drawings.

BRIEF DESCRIPTION OF THE DRAWINGS:

FIG. 1 is a somewhat schematic representation, in elevation, of a sub-sea well installation with a riser conduit having associated flotation means run from a vessel floating on the surface of the sea to the sub-sea well;

FIG. 2 is a detail view, in cross section, of a portion of the riser conduit and associated flotation means taken along the plane II—II in FIG. 1 and illustrating an exemplary embodiment of the present improvement in means for providing a flexible supportive joint between a buoyancy chamber and the riser in accordance with the present invention;

FIG. 3 is a detail view of a preferred exemplary embodiment of the flexible supportive joint for use in association with the buoyancy chamber of the exemplary flotation means employed in the embodiment of FIG. 2;

FIG. 4 is an alternative exemplary embodiment of a flexible supportive joint interposed between portions of a buoyancy chamber and the sub-sea riser in accordance with the present invention; and FIG. 5 is a still further alternative exemplary embodiment of a flexible supportive joint interposed between portions of a buoyancy chamber and the sub-sea riser in accordance with the present invention.

DETAILED DESCRIPTION OF THE EXEMPLARY SUB-SEA WELL, RISER CONDUIT AND FLOTATION MEANS:

The improvement in providing a flexible supportive joint between a buoyancy chamber and its associated riser conduit in a sub-sea well, in accordance with the present invention, is illustrated in association with the flotation means for sub-sea well riser of prior U.S. Pat. No. 3,858,401. The disclosure of that patent is incorporated herein by reference, with the following specific portions thereof being set forth hereinafter to facilitate the following detailed explanation of exemplary embodiments of the present invention in a flexible supportive joint for use in mounting flotation means to a flexible riser conduit run considerable distances from the surface of the sea to a sub-sea well.

A sub-sea well installation is somewhat schematically illustrated in FIG. 1 with a floating vessel or platform 10, having a "moon hole" or slot 11, floating in a sea 12 above a well formation. A well hole conduit 14 is illustrated in the formation with a conventional well template 15 in supportive relation upon the ocean floor. A conventional blow out preventer 16 is illustrated in association with a conventional wellhead, indicated generally at 17, with a conductor coupling member 18, also of known construction, for coupling a riser run to the well. As is conventional, the floating vessel or platform 10 is provided with a derrick 19 above a rotary table 9 positioned over slot 11 for running riser conduit 21 to the well head conduit coupling 18 and thus into communication with the wellhead and well conduit 14 for appropriate drilling operations. Flotation means are indicated generally at 20 along the riser, which is in sections, to provide flotation as more fully described in said U.S. Pat. No. 3,858,401.

Referring to FIG. 2, the lower end of a conduit section 21a is illustrated coupled to the upper end of a lower conduit section 21b. Each such conduit section has a cylindrical wall 22 having a top portion 23 and a bottom portion 24. Each top section 23 is provided with a socket 25 of larger diameter than the conduit section bore in order to receive the lower end 24 of an upper conduit section. Suitable O-rings 26 are provided to seal the junction between the two adjacent conduit sections 21a and 21b which may also be clamped together in known manner in order to prevent their relative separation during use in the sub-sea environment.

Each conduit section 21 further is provided with a bottom flange 28 and a top flange 29, each projecting radially outwardly from the respective bottom and top portions of the conduits, as seen in FIG. 2. These flanges serve to guide associated electrical or hydraulic lines, as hydraulic line 31, and a gas supply line 51 provided for supplying pressurized gas to the various buoyancy chambers. These lines are preferably provided in sections of approximately the same length as each riser conduit section and are connected by suitable connectors, as connectors 33 and 34 for line 31 and connectors 58 and 59 for pipe line 51. The connectors 34 and 59 may be secured to the top flange 29 in a manner in order to seal against the escape of pressurized gas through the flange at these locations.

A plurality of buoyancy chambers are mounted along the riser, as seen in FIG. 1, with each chamber 40 being formed of a cylindrical shell 42 attached to an associated top flange 29 which is in turn secured, or in the exemplary embodiment, formed integrally, of a conduit section. The means for mounting each buoyancy chamber to the riser with an associated flexible supportive joint therebetween will be explained in detail hereinafter. At this point in the description, it is noted, however, that the exemplary flexible supportive joint of the preferred embodiment is illustrated generally at 60 in FIG. 2 in association with an upper chamber shell section 41 having a flange 43 secured to riser associated flange 21 by a plurality of bolts 44. At the lower end of each shell 42, a centralizer ring 45, as seen in FIG. 2, may be provided to generally center the lower open bottom of each chamber relative to the riser conduit sections. Centralizer ring 45 includes an inner ring 46, mounted about a conduit section 22, an outer ring 47 and a plurality of radial interconnecting fins 48. Openings, as at 49, are thus left between the fins 48 to allow for expulsion or introduction of water into the chamber under the influence of the gas pressure therein. Air or gas supply means, including a gas line or gas conduit means, is connected between a source of compressed air or gas on the vessel and each chamber for introducing gas in selectable amounts into the chamber displacing water entrained therein out the open bottom of the chamber to provide a selectable amount of buoyancy to the riser conduit. In the preferred embodiment such gas supply means 50 includes the gas line or gas conduit means 51 and gas valve means 52. The gas valve means includes an associated float means 55 for holding the valve means open when the water level is above a predetermined level in the associated chamber and for closing the valve means when the water level falls below the level to avoid loss of gas out through the open bottom of any chamber. The gas will displace water 12 inside the chamber until the level of water reaches a low enough level so that float 55 is no longer supported on the water and drops a sufficient distance to close the valve seat of valve 52. Therefore, even though there is more water pressure on the lowermost riser conduit sections than on the uppermost riser conduit sections, when the upper riser conduit sections fill with gas, the valve will then close and gas can flow into the chambers associated with the lower conduit sections instead of having gas leaking from the bottoms of the chambers associated with the upper conduit sections.

Additionally, a means for restricting gas flow is provided between each chamber and the gas conduit means for providing a generally equal distribution of gas from the gas conduit to the chambers.

Detailed Description of the Preferred Exemplary Embodiment of Flexible Supportive Joint for the Sub-Sea Riser Flotation Means:

A first, preferred, exemplary embodiment of the present improvement in flotation means for a sub-sea well riser will now be described. As particularly contemplated by the within invention, a flexible supportive joint is provided between the buoyancy chambers 40 and the riser conduit sections 21. As seen in FIG. 2, the preferred exemplary embodiment of flexible supportive joint is illustrated generally at 60 and is provided in association with the flotation means and its mounting to the riser conduits.

The preferred exemplary embodiment of flexible supportive joint includes an assembly of concentric, telescopically oriented inner and outer conduit sections 61 and 62 with a cylindrical elastomeric member bonded therebetween whereby the sections 61 and 62 are flexibly joined together. This assembly of conduit sections 61 and 62 with elastomeric member 63 therebetween is illustrated in the detail view of FIG. 3.

The flexible supportive joint assembly of FIG. 3 may be formed by casting a rubber-like elastomeric material between the conduit or pipe sections 61 and 62 with appropriate bonding material between the elastomeric material and pipe sections as is known in the art. A pressure moldering process could also be used wherein the rubber-like elastomeric material is injected into a mold under presssure and heat with the molded member thereafter being bonded by suitable bonding processes to the pipe sections. As a specific example, the elastomeric member may have a vertical height of approximately 10 inches with a wall thickness of approximately 1½ inches. Inner pipe section 61 may have an inner diameter of 42 inches and a vertical height of a few inches or more greater than the elastomeric member. Outer pipe section 62 may have an inner diameter of 46 inches and have a vertical height approximately equal to that of the inner section. The pipe sections may be provided with wall thicknesses of approximately ¼ inch and, as seen in FIG. 3, are telescopically arranged relative to one another such that portions of each either extend above or below the elastomeric member, respectively. With the aforedescribed dimensions, it is contemplated that a suitable elastomeric member, which may be made of a polyurethane or neoprene material will provide approximately 1,500 square inches of surface bonding areas which, according to known engineering principles, will more than adequately provide for the required supportive strength for the 40 to 50 foot long buoyancy chamber shells to be supported thereby to the riser conduit.

Still referring to FIG. 3, the upper portion 64 of inner pipe or connector section 61 is provided with a bevel or chamfer 65. The lower portion 66 of outer pipe or connector section 62 extending below the elastomeric material 63 is preferably provided with a bevel or chamfer 67. These conduit or connector sections 61 and 62 of the flexible joint are thereby adapted to be welded into a permanent connection to the buoyancy means chamber shell in the preferred exemplary embodiment, as seen in FIG. 2.

Referring now to FIG. 2, it is seen that the flexible supportive joint assembly of FIG. 3 is shown welded into the exemplary buoyancy means chamber shell between the upper chamber shell section 41 and the lower chamber shell section 42, such welds being indicated at 68 and 69, respectively. It is noted that the chamber shell sections 41 and 42 in the present exemplary embodiment have been modified from that illustrated in the prior U.S. Pat. No. 3,858,401 in order to accommodate the flexible supportive joint assembly of FIG. 3. Specifically, upper section 41 has been provided with a flange 43 for connection to flange 29, while also providing, via the undersurface of flange 43, for a surface via which the individual riser conduit and flotation means assemblies can be suspended from an appropriate spider means at the rotary table on the vessel. The lower chamber shell section 42 is provided with an enlarged diameter portion 42' to facilitate alignmment thereof with the outer connector section 62 of the joint assembly indicated generally at 60.

From the foregoing, it can be seen that an exemplary embodiment of flexible supportive joint has been illustrated which will allow for a flexure of the flotation means chambers (specifically the shell portions in the exemplary embodiment) relative to the riser conduit such that the provision of the flotation means, according to the present invention, does not restrict, or objectionably reduce the flexibility of the riser conduit or string.

First Alternative Exemplary Embodiment of Flexible Supportive Joint:

Referring now to FIG. 4, a first alternative exemplary embodiment of a flexible supportive joint is illustrated generally at 70, the symmetrical construction of the joint being shown in a detail section view in FIG. 4. In this alternative exemplary embodiment, the flexible supportive joint comprises a ball and socket-like means for mounting the outer shell 42 of the buoyancy chamber to the riser via the previously described riser associated flange 29. Such ball and socket-like means includes the provision of an upper conduit or connector section 71 having means at one end, including flange 72, for fastening via bolts 44 to the riser associated flange 29. Conduit section 71 includes an outwardly extending conical portion 72 having a depending skirt portion 73. A lower part of depending skirt 73 is provided with an outwardly facing truncated spherical outer surface 74. A lower conduit or connector section 75 is welded at 76 to the outer shell 42 of the buoyancy chamber. This connector or conduit section 75 may be chamfered at its lower end, as explained with regard to the assembly of FIG. 3, to facilitate its welding to the flotation means buoyancy chamber shell 42. Connector section 75, in this exemplary embodiment, is provided in two parts 75a and 75b which together form an inwardly concave spherical inner surface 77 mating to outer surface 74. To facilitate the assembly of section 75 to the spherical portion of skirt 73, the two portions 75a and 75b may be assembled about surface 74 and then welded into effectively integral relation in order to provide a ball and socket-like flexible joint for transmitting load between connector sections 72 and 75 while providing for flexure of the chamber shell 42 relative to its mounting to the riser conduit.

Means are provided for sealing the flexible joint of the first alternative exemplary embodiment of FIG. 4 against the escape of compressed gas within the chamber to the exterior thereof through the joint. As seen in FIG. 4, a flexible, axially expandable and compressable bellows 78 is provided with its upper end welded at 79 to an inner surface of skirt 73 and its lower end welded at 80 to an inner housing member 81 which in turn is welded to lower connector or conduit section 75 via weld 82. Housing 81 has its inner wall offset from connector section 75 to provide an annular space 83 into which the lower end of the spherical portion of skirt 73 may move as section 75 flexes relative to skirt 73.

Second Alternative Exemplary Embodiment of Flexible Supportive Joint:

A second alternative exemplary embodiment of flexible supportive joint is illustrated in FIG. 5 generally at 90. In this embodiment, an upper connector or conduit section 91 is provided at its upper end with a flange 92 connected via bolts 44 to the riser conduit associated flange 29. A lower enlarged portion 93 of this connector section 91 is provided with a depending annularly extending head ring 94, depending from a reduced width neck ring 95, to mechanically interfit with an elastomeric annular member 96 which may be cast and bonded thereon or separately molded and bonded as described with regard to the embodiment of FIG. 3. A lower connector or conduit section 97 is welded at its lower end, as by weld 98, to a buoyancy chamber outer shell 42, as before, with an upper enlarged annular portion 99 having an annular head ring 100, extending upwardly from reduced neck ring 101, to mechanically interfit and be bonded to the lower end of the elastomeric member 96. Connector section 97 is further provided, in this second alternative exemplary embodiment, with an outwardly facing truncated spherical surface 102. An annular, inwardly concave bearing surface 103 is formed on the lower end of a cylindrical housing 104 which depends from, and is welded at 105 to the upper connector or conduit section enlarged part 93. This arrangement provides for limiting the amount of flexing between the buoyancy chamber shell 42 and riser conduit as well as a housing about the elastomeric member 96, the latter being capable of contraction and expansion during such flexing to provide the desired flexible supportive joint. A key way 106 may be provided in spherical surface 102 in which key 107 rides to prevent relative rotation between the connector sections 91 and 97. Under high load conditions, the elastomeric member 96 will be stretched until surface 108 of the lower connector section head 99 rests upon the upwardly facing stop surface 109 of the lower annular and radially inwardly extending ring portion 110 in which bearing surface 103 is formed. However, it is contemplated that in most situations surfaces 108 and 109 will function as limit stops for a tilting movement of the connector sections with the elastomeric member 96 being so provided as to support the weight of the buoyancy chamber shells, but stretching and contracting as required under the additional bending loads imparted during relative flexing between the shell 42 and riser conduit.

Having thus described a preferred and two alternative exemplary embodiments of the present improvement in a means for providing a flexible supportive joint between a sub-sea well riser and its associated buoyancy chamber, it should be understood by those skilled in the art that the foregoing descriptions were exemplary only and that various other alternatives, embodiments, modifications and adaptations may be made thereon which come within the scope of the present invention which is defined by the following claims.

We claim:

1. In a flotation means for a subsea well riser including at least one buoyancy chamber, the improvement comprising the provision of:
    means comprising an elastomeric member in sole supporting relation between said chamber and said riser for providing a flexible supportive joint between said buoyance chamber and said riser whereby said chamber is supported only by said elastomeric member from and flexible relative to said riser.

2. The improvement in flotation means of claim 1 wherein said means for providing a flexible supporting joint comprises:
    an assembly of concentric inner and outer conduit sections, and a cylindrical elastomeric member bonded therebetween whereby said sections are flexibly joined together by said elastomeric member.

3. The improvement in flotation means of claim 1 wherein said means for providing a flexible supporting joint comprises:
    a first conduit section and means for mounting it to said riser, a second conduit section with at least a portion thereof concentrically and telescopically oriented relative to said first section and a rubber-like flexible member between and joining said sections.

4. The improvement in flotation means of claim 1 wherein said means for providing a flexible supporting joint comprises:
    a ball and socket like means for mounting an outer shell of said chamber to said riser.

5. The improvement in flotation means of claim 1 wherein said means for providing a flexible supportive joint comprises:
    an upper conduit section having means at one end for fastening to the riser and means for providing a depending truncated spherical outer surface;
    a lower conduit section secured to an outer shell of said chamber at one end and having means at the other end for providing an upwardly opening, inwardly concave, spherical inner surface mating said outer surface of said upper conduit, whereby said sections are joined together by a flexible connection therebetween.

6. The improvement in flotation means of claim 1 wherein said means for providing a flexible supportive joint comprises:
    sealing means extending between and interiorly of said sections for sealing against air flow from said chamber through said flexible connection.

7. The improvement in flotation means as in claim 6 wherein said means for providing a flexible supportive joint comprises:
    said sealing means comprises an axially compressible metal bellows.

8. The improvement in flotation means as in claim 6 wherein said means for providing a flexible supportive joint comprises:
    an upper conduit section and means for mounting it to said riser;
    a lower conduit section and means for mounting it to a portion of said chamber and
    an elastomeric member coaxially interposed between and secured to said sections to flexibly interconnect them.

9. The improvement in flotation means as in claim 8 wherein said means for providing a flexible supportive joint comprises:
    means on said sections for mechanically interconnecting with said member.

10. The improvement in flotation means as in claim 9 wherein said means for providing a spherical bearing surface mechanical interconnection between said sections.

11. In a flotation means for a subsea well riser conduit run to a subsea well, said flotation means including one or more buoyancy gas receiving chambers and means for mounting each of said chamber to said riser conduit, the improvement in mounting means comprising:
    an upper connector member and means for connecting it to said riser;
    a lower connector member provided on a buoyancy chamber; and
    means including an elastomeric member for providing the sole support for a flexible joint between said upper and lower connector members to secure said chamber to said riser while allowing for flexure between said chambers and said riser.

12. The improvement in mounting means of claim 11 wherein said means for providing a flexible joint between said upper and lower connector members comprises a ball and socket like joint.

13. The improvement in mounting means of claim 12 wherein said means for providing a flexible joint between said upper and lower connector members comprises an elastomeric member and a ball and socket like joint.

14. A subsea riser and flotation means construction of improved flexibility for use in conducting subsea drilling operations comprising:
a plurality of riser conduit sections and buoyancy chamber assemblies in a continuous array extending from a floating vessel toward a subsea well with a flexible interconnection between each said chamber and section of said assemblies.

15. The subsea riser and flotation means construction of claim 14 wherein said flexible interconnection comprises:
a flexible supportive joint between said buoyancy chamber and said riser conduit section whereby said chamber is supported from and flexible relative to said riser conduit section.

16. The subsea riser and flotation means construction of claim 15 wherein said flexible supportive joint comprises:
an assembly of concentric inner and outer conduit sections, and a cylindrical elastomeric member bonded therebetween whereby said sections are flexibly joined together by said elastomeric member.

17. The subsea riser and flotation means construction of claim 15 wherein said flexible supportive joint comprises:
a first conduit section and means for mounting it to said riser, a second conduit section with at least a portion thereof concentrically and telescopically oriented relative to said first section and a rubber-like flexible member between and joining said sections.

18. The subsea riser and flotation means construction of claim 15 wherein said flexible supportive joint comprises:
a ball and socket like means for mounting an outer shell of said chamber to said riser.

19. The subsea riser and flotation means construction of claim 15 wherein said flexible supportive joint comprises:
an upper conduit section having means at one end for fastening to the riser and means for providing a depending truncated spherical outer surface;
a lower conduit section secured to an outer shell of said chamber at one end and having means at the other end for providing an upwardly opening, inwardly concave, spherical inner surface mating said outer surface of said upper conduit, whereby said sections are joined together by a flexible connection therebetween.

20. An assembly of a marine conductor conduit section and buoyancy chamber of improved flexability comprising:
a riser conduit section having an associated flange;
a first connector conduit section joined to said flange;
a buoyance chamber having a second connector conduit section; and
means for providing a supportive flexible joint between said connector sections.

21. The assembly of claim 20 wherein said means for providing a supportive flexible joint comprises an elastomeric member joining said connector sections.

22. The assembly of claim 20 wherein said means for providing a supportive flexible joint comprises a ball and socket like connection between said connector sections.

23. The assembly of claim 20 wherein said means for providing a supportive flexible joint comprises an elastomeric member joining said connector sections and a ball and socket like connection limiting the extent of flex between said connector sections.

* * * * *